United States Patent
Artz, Jr. et al.

(10) Patent No.: US 7,895,355 B2
(45) Date of Patent: *Feb. 22, 2011

(54) METHOD AND SYSTEM FOR DETECTING GAPS IN A DATA STREAM

(75) Inventors: John C. Artz, Jr., Woburn, MA (US); Heeren Pathak, Woburn, MA (US)

(73) Assignee: Vignette Software LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/614,182

(22) Filed: Nov. 6, 2009

(65) Prior Publication Data

US 2010/0058158 A1  Mar. 4, 2010

Related U.S. Application Data

(63) Continuation of application No. 10/616,136, filed on Jul. 9, 2003, now Pat. No. 7,627,688.

(60) Provisional application No. 60/394,619, filed on Jul. 9, 2002.

(51) Int. Cl.
   *G06F 15/16* (2006.01)
(52) U.S. Cl. ........................ 709/234; 709/206; 709/219; 709/224; 709/229; 709/245; 370/503; 370/504; 370/516; 370/230; 370/235
(58) Field of Classification Search ................. 709/206, 709/219, 224, 229, 223, 245; 705/7, 10, 705/14, 26, 35, 500; 370/503, 504, 516, 370/230, 230.1, 231, 235
See application file for complete search history.

(56) References Cited

U.S. PATENT DOCUMENTS

| 5,412,801 | A | * | 5/1995 | de Remer et al. | ............. 714/20 |
| 5,557,717 | A |   | 9/1996 | Wayner |   |
| 5,668,801 | A | * | 9/1997 | Grunenfelder | .............. 370/253 |
| 5,732,218 | A |   | 3/1998 | Bland et al. |   |
| 5,796,952 | A |   | 8/1998 | Davis et al. |   |
| 5,837,899 | A | * | 11/1998 | Dickerman et al. | ........... 73/610 |
| 6,014,706 | A | * | 1/2000 | Cannon et al. | .............. 709/231 |
| 6,014,707 | A | * | 1/2000 | Miller et al. | ................ 709/232 |

(Continued)

OTHER PUBLICATIONS

*XSL Transformations (XSLT) Version 1.0, W3C Recommendation*, www.w3.org/TR/1999/REC-xslt-19991116, pp. 1-87, Nov. 16, 1999.
Cabena, Peter et al., Intelligent Miner for Data Applications Guide, IBM RedBook SG24-5252-00, Mar. 1999.

(Continued)

*Primary Examiner*—Thu Nguyen
*Assistant Examiner*—Tauqir Hussain
(74) *Attorney, Agent, or Firm*—Sprinkle IP Law Group

(57) ABSTRACT

Systems and methods are described which allow the detection of gaps in a set of data. These systems and methods may include defining streams of data from a network topology, associating incoming data with one or more of these streams, and processing these streams. A gap may be detected by comparing the times of events in the stream. If a gap is detected remedial action may be taken, and processing of the streams temporarily halted. Processing of the streams may continue when data for a certain stream is received, or after the lapse of a certain period of time.

14 Claims, 3 Drawing Sheets

U.S. PATENT DOCUMENTS

| | | | |
|---|---|---|---|
| 6,041,335 | A | 3/2000 | Merritt et al. |
| 6,112,186 | A | 8/2000 | Bergh et al. |
| 6,119,103 | A | 9/2000 | Basch et al. |
| 6,128,663 | A | 10/2000 | Thomas |
| 6,138,156 | A | 10/2000 | Fletcher et al. |
| 6,144,962 | A | 11/2000 | Weinberg et al. |
| 6,205,472 | B1 | 3/2001 | Gilmour |
| 6,286,043 | B1 | 9/2001 | Cuomo et al. |
| 6,321,206 | B1 | 11/2001 | Honarvar |
| 6,430,539 | B1 | 8/2002 | Lazarus et al. |
| 6,453,336 | B1* | 9/2002 | Beyda et al. ............... 709/204 |
| 6,456,305 | B1 | 9/2002 | Qureshi et al. |
| 6,496,824 | B1 | 12/2002 | Wilf |
| 6,509,898 | B2 | 1/2003 | Chi et al. |
| 6,559,882 | B1* | 5/2003 | Kerchner ..................... 348/61 |
| 6,606,657 | B1 | 8/2003 | Zilberstein et al. |
| 6,615,305 | B1* | 9/2003 | Olesen et al. ............... 710/262 |
| 6,629,136 | B1 | 9/2003 | Naidoo |
| 6,640,215 | B1 | 10/2003 | Galperin et al. |
| 6,732,331 | B1 | 5/2004 | Alexander |
| 6,757,740 | B1 | 6/2004 | Parekh et al. |
| 6,785,769 | B1 | 8/2004 | Jacobs et al. |
| 6,836,773 | B2* | 12/2004 | Tamayo et al. ..................... 1/1 |
| 6,839,682 | B1 | 1/2005 | Blume et al. |
| 6,873,984 | B1* | 3/2005 | Campos et al. ..................... 1/1 |
| 6,892,238 | B2 | 5/2005 | Lee et al. |
| 6,966,034 | B2 | 11/2005 | Narin |
| 6,968,385 | B1 | 11/2005 | Gilbert |
| 6,996,536 | B1 | 2/2006 | Cofino et al. |
| 7,032,017 | B2 | 4/2006 | Chow et al. |
| 7,096,271 | B1* | 8/2006 | Omoigui et al. ............. 709/231 |
| 7,401,066 | B2* | 7/2008 | Beinglass et al. ..................... 1/1 |
| 7,461,120 | B1 | 12/2008 | Artz et al. |
| 2001/0037321 | A1 | 11/2001 | Fishman et al. |
| 2002/0029275 | A1* | 3/2002 | Selgas et al. ................ 709/227 |
| 2002/0057675 | A1* | 5/2002 | Park ........................... 370/352 |
| 2002/0062223 | A1 | 5/2002 | Waugh |
| 2002/0091755 | A1 | 7/2002 | Narin |
| 2002/0095322 | A1* | 7/2002 | Zarefoss ........................ 705/7 |
| 2002/0107841 | A1 | 8/2002 | Hellerstein et al. |
| 2002/0112082 | A1 | 8/2002 | Ko et al. |
| 2002/0129381 | A1* | 9/2002 | Barone et al. ............... 725/137 |
| 2002/0143925 | A1 | 10/2002 | Pricer et al. |
| 2002/0150123 | A1* | 10/2002 | Ro ............................. 370/465 |
| 2002/0161673 | A1 | 10/2002 | Lee et al. |
| 2002/0178169 | A1 | 11/2002 | Nair et al. |
| 2002/0193114 | A1* | 12/2002 | Agrawal et al. ............. 455/442 |
| 2003/0088716 | A1 | 5/2003 | Sanders |
| 2003/0154184 | A1* | 8/2003 | Chee et al. ..................... 707/1 |
| 2003/0190649 | A1* | 10/2003 | Aerts et al. ..................... 435/6 |
| 2003/0202509 | A1* | 10/2003 | Miyano et al. .............. 370/367 |
| 2003/0212594 | A1 | 11/2003 | Hogan |
| 2003/0236892 | A1 | 12/2003 | Coulombe |
| 2004/0205489 | A1 | 10/2004 | Bogat |
| 2004/0215599 | A1* | 10/2004 | Apps et al. ..................... 707/2 |
| 2005/0102292 | A1* | 5/2005 | Tamayo et al. ................ 707/10 |
| 2006/0271989 | A1* | 11/2006 | Glaser et al. ................ 725/111 |

OTHER PUBLICATIONS

Datasage.com News and Events—DataSage Releases netCustomer, the 1$^{st}$ Individualization Solution for E-Commerce, retrieved Feb. 16, 2005 from Archive.org , 3 pgs, Aug. 2, 1999.

Datasage.com—Executive Overview—Retail, Retail Data Mining Executive Overview, retrieved Feb. 16, 2005 from Archive.org, 7 pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., *CRISP-DM 1.0—Step-by-step data mining guide*, retrieved from www.crisp-dm.org Feb. 17, 2005, pp. 1-78, 2000.

Mozilla User-Agent String Specification obtained from website <httop:www.mozilla.org/build/revised-user-agent-strings.html>, pp. 1-5, Aug. 23, 2007.

Office Action issued in U.S. Appl. No. 10/616,136, mailed Mar. 12, 2007, 9 pgs.

Office Action issued in U.S. Appl. No. 10/616,107, mailed Mar. 21, 2007, 9 pgs.

Office Action issued in U.S. Appl. No. 10/616,408, mailed Jun. 6, 2007, 10 pgs.

Office Action issued in U.S. Appl. No. 10/616,136, mailed Aug. 29, 2007, 11 pgs.

Office Action issued in U.S. Appl. No. 10/616,107, mailed Sep. 11, 2007, 9 pgs.

Office Action issued in U.S. Appl. No. 10/616,408, mailed Dec. 14, 2007, 10 pgs.

Office Action issued in U.S. Appl. No. 10/616,107, mailed Dec. 31, 2007, 9 pgs.

Office Action issued in U.S. Appl. No. 10/616,136, mailed Feb. 15, 2008, 10 pgs.

Office Action issued in U.S. Appl. No. 10/616,408, mailed May 28, 2008, 12 pgs.

Office Action issued in U.S. Appl. No. 10/616,136, mailed Aug. 19, 2008, 10 pgs.

Office Action issued in U.S. Appl. No. 10/616,107, mailed Nov. 12, 2008, 11 pgs.

* cited by examiner

METHOD AND SYSTEM FOR DETECTING GAPS IN A DATA STREAM

RELATED APPLICATIONS

This application is a continuation of, and claims a benefit of priority under 35 U.S.C. 120 of the filing date of U.S. patent application Ser. No. 10/616,136 by inventors Heeren Pathak and John C. Artz, Jr. entitled "System and Method for Detecting Gaps in a Data Stream" filed on Jul. 9, 2003 which in turn claims the benefit of priority under 35 U.S.C. §119(e) to U.S. Patent Application No. 60/394,619 entitled "System and Method For Detecting Gaps in a Data Stream" by John C. Artz Jr. and Heeren Pathak filed Jul. 9, 2002. This application is related to U.S. patent application Ser. No. 10/616,107 filed Jul. 9, 2003 entitled "System and Method of Associating Events with Requests" by John C. Artz et al., now U.S. Pat. No. 7,603,430 issued Oct. 13, 2009, and U.S. application Ser. No. 10/616,408 filed Jul. 9, 2003 entitled "Method and System for Site Visitor Information" by John C. Artz et al., now U.S. Pat. No. 7,461,120 issued Dec. 2, 2008. All applications cited within this paragraph are fully incorporated herein by reference.

TECHNICAL FIELD OF THE INVENTION

This invention relates in general to the processing of data, and more particularly, to detecting gaps in a data stream. Even more particularly, this invention relates to detecting gaps in transmitted data streams and performing user configurable operations when these gaps are detected.

BACKGROUND OF THE INVENTION

In today's rapidly changing marketplace it is important for businesses of all sizes to disseminate information about the goods and services they have to offer. To accomplish this efficiently, and comparatively inexpensively, many business have set up sites on the World Wide Web. These sites provide information on the products or services the business provides, the size, structure, and location of the business; or any other type of information which the business may wish people to access.

Conversely, it is also important for businesses to collect information on the people who are interested in them. These people may include customers, investors or potential employees. One inexpensive method of obtaining data on these people and their various interests is to recreate a visitor's activity on the website of the business. After assimilating data on visitors to their website, the business will have a clearer picture of their interests, and to some degree the effectiveness of the various portions of the website.

The construction and implementation of many websites, however, makes this a difficult task. Though a website may appear as a seamless entity when viewed with a Internet web browser, in truth most websites are run by a variety of servers and computers. For example, one group of servers may be running applications providing information on support, some servers may be running CGI gateway applications, and others may be providing product data. This division means that a visitor to the website may be hosted by one server at the beginning of his visit, switched to another server while navigating the website, and wind up on a third before his visit is complete.

Thus, to recreate a visitor's activity on all websites during a single visit (session) all the data about that particular visitor's activity on every server which operates the website should be analyzed. Because there is such a large volume of data available on each user it is helpful to process the data feeds from these servers in real-time. This means that the availability of the data is of the utmost importance. If data is missing or otherwise incomplete the wrong calculations may take place. It is also costly to add missed data back to a set of data which has already been processed. Adding to the complications is the fact that data may not be reported from the various servers in a synchronous manner.

Therefore, in order to reconstruct a visitor's session it is critical that the system analyzing the data reported from the servers is aware of what data to expect, and what data is actually available. Furthermore, the system must be able to synchronize the data under scrutiny. Prior art systems for processing this session and utilization data were not necessarily aware of the type and availability of data, and would either process incomplete data or required data to be bundled and ready to be processed as a batch. Additionally, these prior art systems lacked awareness of the network topology from which they received data, which in turn hampered these systems ability to make intelligent decisions about missing data.

Thus, there is a need for systems and methods which may process data streams from a network topology, detect gaps in a data stream in order to prevent the processing of incomplete data, and which may store the incomplete data separately until it is complete and capable of being processed as a whole.

SUMMARY OF THE INVENTION

Systems and methods for the detection of gaps in a set of data are disclosed. These systems and methods allow data to be associated with streams, gaps in the data to be detected, and appropriate remedial action to be taken. In many embodiments, streams may be defined based upon a network topology, incoming data is then associated with those streams. Processing of these streams is then determined by an analysis of the timing of events within the stream.

Additionally, systems are presented which embody this type of methodology in computer systems, hardware, and software that detect gaps in a set of data.

In some embodiments, a time difference is calculated for the events in each stream and the processing of each stream depends upon the calculated time difference.

In other embodiments, the processing of all streams may be halted if the time difference calculated in any stream is greater than a first time period. In related embodiments the time period after which processing of streams may be halted is defined by a user.

In yet other embodiments, a notification is provided when a gap in any data stream is detected. In related embodiments, this notification may be an email sent to a system administrator.

Still other embodiments resume the processing of the data streams upon reception of more data associated with the stream in which a gap was detected.

In another set of embodiments, processing of the data streams continues after a certain period of time. In related embodiments, this period of time may be user configurable.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
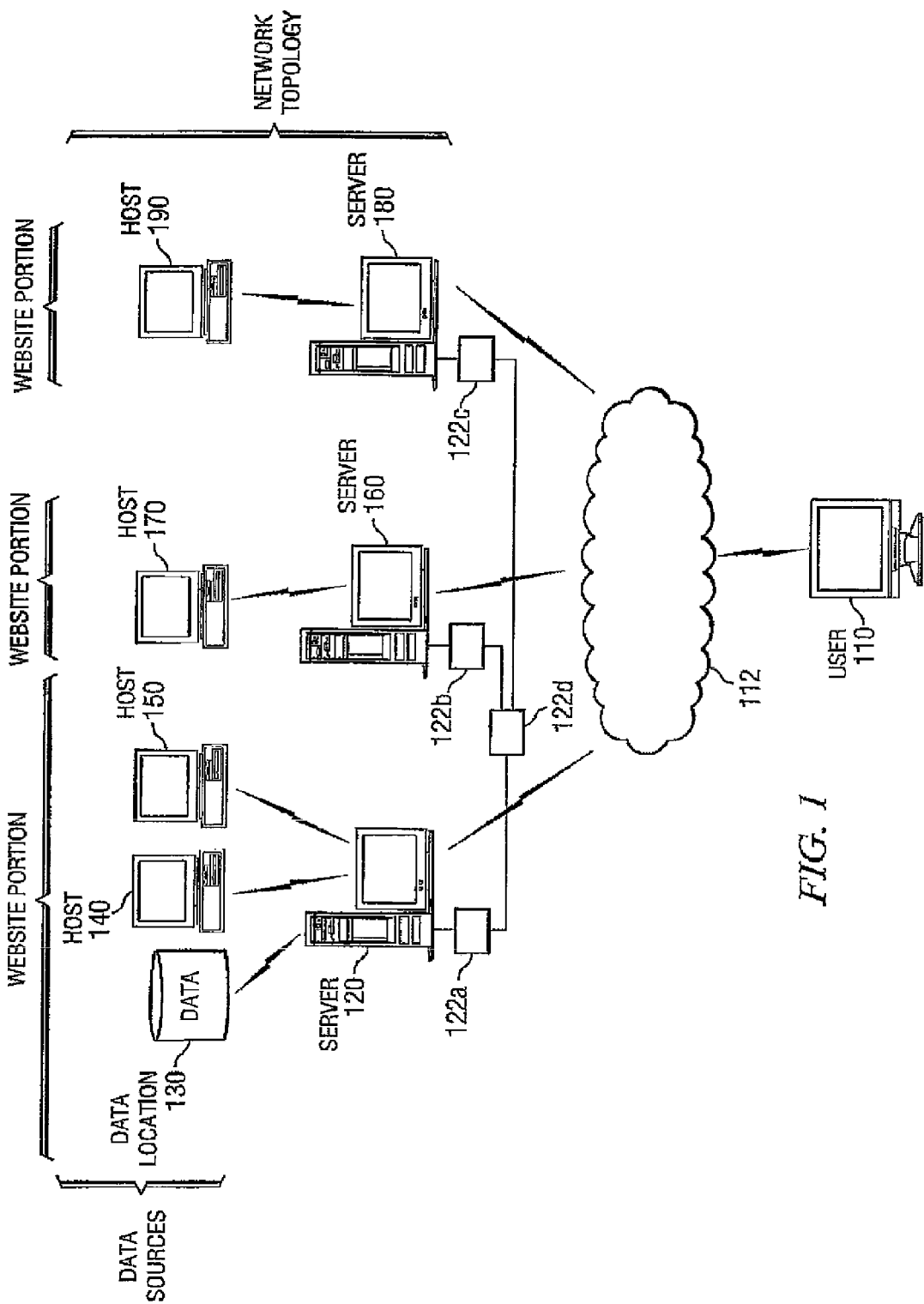
FIG. 1 is a block diagram of an example of the network topology of a typical website.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow: a network topology is a mapping between the physical components that produce data and the logical groupings of data that the physical network may produce. A network topology may be the layout of a particular network or system of computers, which in turn may define the data which can be expected by a data processing system employing a method of detecting gaps in this data. This network topology may in turn be composed of logical or physical servers and their associated hosts and data locations. From this network topology a series of streams can be defined. A stream may be regarded as a logical data source, and may be a 1 to 1 mapping of physical to logical sources or a many to 1 mapping of many physical sources into one logical source. Servers may be fault tolerant, indicating that though there may be several hosts or data locations associated with a logical or physical server for the sake of redundancy, data coming from any host or data location associated with that particular server should be regarded as one stream.

Though the exemplary embodiment described below utilizes gap detection in a system designed to analyze data transmitted from servers and other machines implementing a website, those skilled in the art will appreciate that these same systems and methods may be employed for a myriad number of other uses and applications, such as detecting gaps in extant and resident files, or in other types of network transmissions. Additionally, it will be understood that these same systems and methods can be implemented in software systems, computer programs, hardware, and any combination thereof.

Attention is now directed to systems and methods for detecting gaps in a set of data or in a data transmission. These systems and methods may divide the sources of data to be processed into streams and analyze these streams to detect gaps. After gaps are detected remedial action may be taken, and processing of the data may continue. The systems and methods described are especially useful when employed in a data processing system designed to receive data from a variety of sources.

Turning now to FIG. 1, an example of a network which implements a website is depicted. A logical top level website may be presented to user 110 over network 112 by different physical machines. This network topology, responsible for presenting a logical website such as a top level URL, may be defined in terms of servers 120, 160, 180 and their associated hosts 140, 150, 170, 190 and data locations 130. Servers 120, 160, 180 may contain one or more hosts 140, 150, 170, 190 or data locations 130, and each may be responsible for running a different portion of the website presented to user 110. For example, server 120 may be responsible for providing information on products manufactured by a company, while other servers 160, 180 may be responsible for providing information regarding the application process to prospective employees. Additionally, a single physical machine may host multiple applications or web functions, each capable of generating its own logs. Thus, a single physical host 140, 150, 170, 190 can be associated with multiple logical servers. Consequently, as user 110 navigates the website, user 110 may be in communication with a variety of different servers 120, 160, 180.

During user's 110 visit to the website, servers 120, 160, 180, hosts 140, 150, 170, 190 and data locations 130 provide information, data, and applications that user 110 utilizes. In turn, servers 120, 160, 180, hosts 140, 150, 170, 190 and data locations 130 record information about user's 110 activities.

This collected information may be analyzed to determine the activities that each user 110 performed during his visit to the website. To properly recreate the user's 110 activities, however, all the data about a user 110 on servers 120, 160, 180, hosts 140, 150, 170, 190 and data locations 130 should be analyzed. Since most systems designed to analyze this user 110 data, including relationship management servers, are designed to process real-time data feeds, availability of this user 110 data is critical. If data is missing, or data from different locations is out of synch, wrong calculations may occur.

Since user 110 data resides on servers 120, 160, 180, hosts 140, 150, 170, 190 and data locations 130, in order to analyze this data it usually must be transmitted from these servers 120, 160, 180, hosts 140, 150, 170, 190 and data locations 130 to a central location for collation and assembly. However, it is difficult to align data from many different sources to produce a cohesive set of data, as data arrives at different times from different servers and is not necessarily in chronological order. Additionally, many times the value of the data under analysis is highly dependent on the timeliness of that data. To assist in this collation and assembly, it is useful to detect when there are gaps in the incoming data in order that some form of remedial action may be taken.

Figure 2:
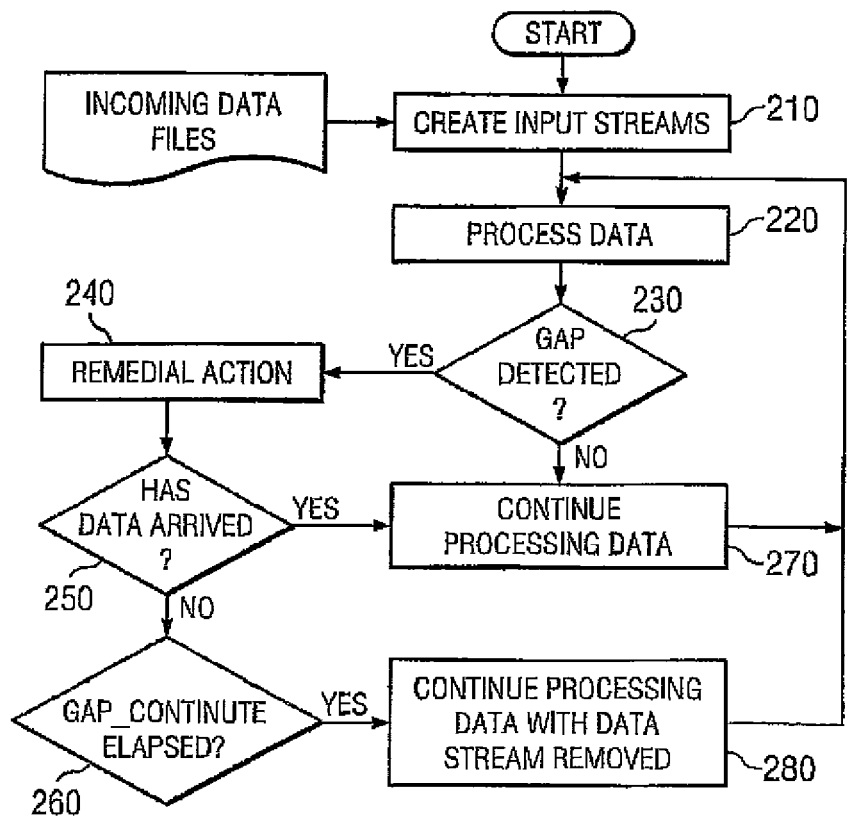
FIG. 2 is a flowchart of an embodiment of a method for detecting gaps in a data stream.

In FIG. 2 a flowchart for an embodiment of a method of detecting gaps in data is depicted. In order to discover when there are gaps in a data being received over a network, it is helpful to define what data is to be expected and what data is available. This may be done by creating streams of input data with which to associate incoming files 210. In some embodiments this configuration is done by a user, in other embodiments these streams can be generated from a file containing a description of the network topology from which the data will be originating.

The creation of these streams is based on the layout of the network under analysis. Usually, streams are defined in terms of servers 120, 160, 180 and their associated hosts 140, 150, 170, 190 or data locations 130. A host 140, 150, 170, 190 may be a single machine, and a server 120, 160, 180 may contain one or more hosts 140, 150, 170, 190 or data locations 130 that should be considered together. Each server 120, 160, 180 and its associated data locations 130 and hosts 140, 150, 170, 190 may be marked as a stream. A server 120, 160, 180 may also be marked as fault tolerant, indicating that data coming from that server 120, 160, 180 or the associated hosts 140, 150, 170, 190 and data locations 130 should be considered one stream. When files subsequently come in to this central location from the various hosts 140, 150, 170, 190, data locations 130, and servers 120, 160, 180 which make up the network topology, these files are then associated with one of the defined streams. Processing of these streams may then begin 220.

During processing, gaps in the incoming data may be detected 230. During analysis or processing of the data available from the network, data loss between a last event and a next event may be calculated. This data loss may be determined by the comparison of a wide variety of factors, including transaction elements, timing, and the presence of fault tolerant physical devices. After this data loss reaches a certain threshold the system will determine that a gap exists. The amount of data loss which is acceptable before the system determines it has detected a gap may be user configurable.

In one specific embodiment, if the difference between the time of the last event received or processed and the next event available from a single stream is greater than a certain time period then the system will have detected a gap. In some embodiments the time period considered to be a gap is a variable labeled GAP_TIME, and may set by a user. The GAP_TIME variable may be global, or set and assigned to each stream during configuration of the system within which the gap detection methodology is being utilized. Therefore, a stream has a gap if the time of the next event available in that stream is past the time of the last event plus the GAP_TIME variable. A stream can also be considered to have a gap if there is no data available for that stream upon start up of the gap detection method. In specific embodiments, if the GAP_TIME variable is set to 0 gap detection will not be performed on the incoming data.

If a gap is detected in a stream remedial action may then be taken 240. In many embodiments, this remedial action may consist of stopping processing of the data streams and sending a notification. In some related embodiments this notification may be an email to a user or system administrator regarding this gap in the data. While the processing of data is halted, incoming data may be stored for later processing.

At some point the system employing the gap detection methodology may resume processing data 270, 280. If the stream in which a gap was detected begins receiving data again 250, the processing of streams may resume 270. Additionally, in some embodiments a user may define a threshold; after this threshold is reached the system may continue with processing data. This threshold may be dependent on a variety of factors such as transaction elements, fault tolerance, and timeliness of the data.

As the timeliness of data is often its value, in many embodiments, a GAP_CONTINUE variable is present to allow tradeoffs to be made between the accuracy of the data under analysis and its timeliness. In certain related embodiments this GAP_CONTINUE variable may be configured by a user, which gives users of the data processing system flexibility in tuning the behavior of the system.

In the event the stream in which a gap was detected does not begin receiving data after the amount of time defined by the GAP_CONTINUE variable has elapsed 260, the processing of data in streams other than the stream in which a gap was detected may continue 280. In some embodiments if GAP_CONTINUE is set to −1 data processing may not continue until manually configured to do so, similarly if GAP_CONTINUE is set to 0 data processing will continue with no pause. This gap detection methodology can then continue to be applied to the streams undergoing processing.

EXAMPLES

Specific embodiments of the invention will now be further described by the following, nonlimiting examples which will serve to illustrate in some detail various features and functionality. The following examples are included to facilitate an understanding of ways in which the invention may be practiced. It should be appreciated that the examples can be considered to constitute preferred modes for the practice of the invention. However, it should be appreciated that many changes can be made in the exemplary embodiments which are disclosed without departing from the spirit and scope of the invention.

Example 1

FIGS. 3-8 are an example of embodiments of the gap detection methodology presented in use on data streams.

Note: In FIGS. 3-8, time does not have any particular units; it is just representative of some arbitrary measurement of time.

Figure 3:
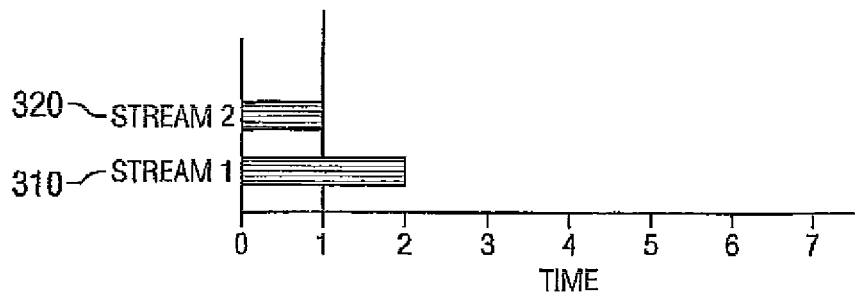
FIGS. 3-8 depict an example of an embodiment of a gap detection method employed in a data processing system.

At initialization of the system there are two streams 310, 320 that have some data available, as can be seen in FIG. 3.

The system processes only as much data as is available from all streams. In FIG. 3 the data received between time period 0 and time period 1 is processed. Since no data has arrived from stream 2 320 the data received from stream 1 310 between time periods 1 and 2 is not yet processed. The data not processed from stream 1 310 is saved for later processing.

Figure 4:
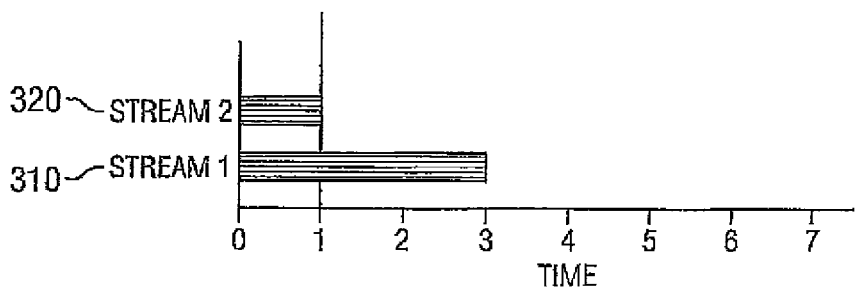
Figure 5:
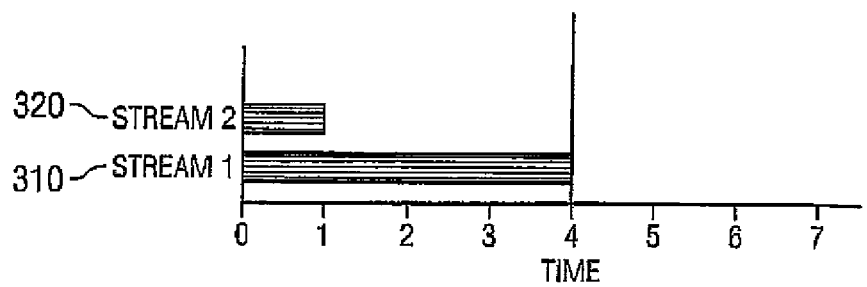

As can be seen in FIG. 4 as time passes, more data arrives from stream 1 310. However, since there is still no data from stream 2 320, no available data may be processed. For the purposes of the example depicted in FIGS. 3-8 assume the GAP_TIME is 2. In this case, since no data has arrived from stream 2 320 between the time periods of 1 and 3, stream 2 320 is considered to have a gap. The system will notify an administrator that a gap has occurred. Assume for purposes of this example that GAP_CONTINUE is 1, if more data is seen from stream 1 310, after time period 4 the system will resume processing this data as seen in FIG. 5.

Figure 6:
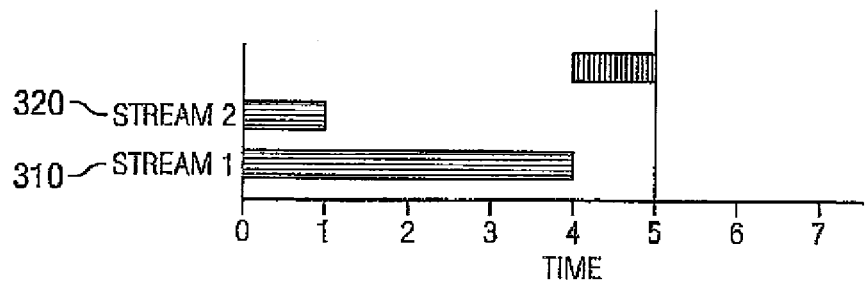

In FIG. 6, the system is now ignoring stream 2 320 and proceeding with processing data from stream 1 310. In this collection of data, data has arrived from an unknown source. Since this source was not expected, the data is not processed and the system administrator may be notified. The processing of data from stream 1 310 continues.

Figure 7:
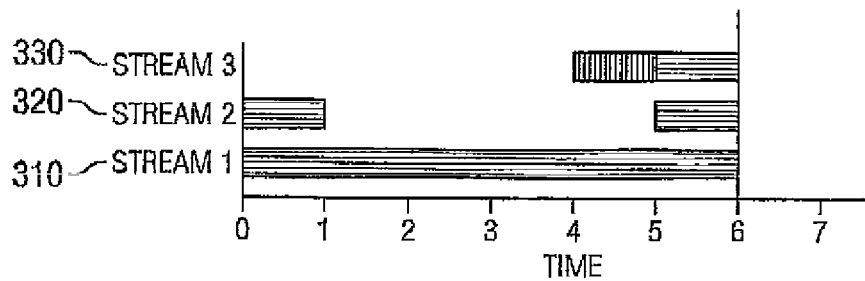

The system administrator may update the network topology file to include stream 3 330 and fix stream 2 320 so it produces data, as depicted in FIG. 7. Data now comes in from streams 1, 2, and 3 310, 320, 330 and is processed normally.

Figure 8:
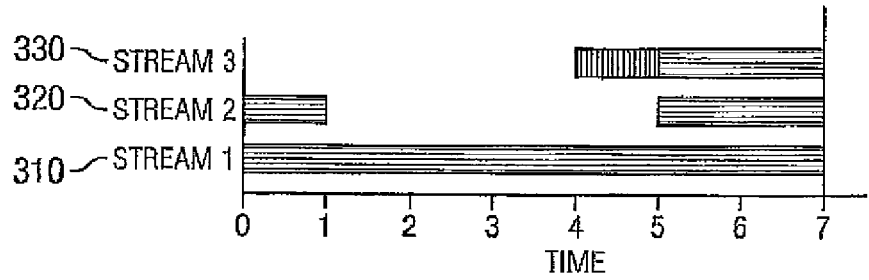

In FIG. 8 the system is running smoothly. Data comes in regularly and the system moves forward accordingly.

Example 2

The following example is an embodiment of the gap detection systems and methods discussed herein:

```
// GAP DETECTION ALGORITHM DETAILS
boolean global_gap = false
get nextEvent
if (lastTime != null) {
  // first do gap detection on the two events
  if (nextEvent.time >= (lastTime + GAP_TIME)) {
    // a system-wide gap has been detected
    email "The RMS Sessionizer has detected a system-wide gap of <nextEvent.time-lastTime> minutes."
    if (GAP_SKIP > 0) {
      GAP_SKIP--;
      email "Skipped that gap. <GAP_SKIP> more gaps will be skipped."
    } else {
      // decide if we should wait to continue
      if (CONTINUE_TIME < 0) {
        email "Waiting for human intervention to continue."
        email "Please provide the missing data"
        email "or invoke the sessionizer using the GAP_SKIP option"
        global_gap = true // we not going to process
      } else {
        if (nextEVENT.time > (lastTIME + GAP_TIME + CONTINUE_TIME)) {
          email "Data is available past the amount of time set to continue"
          email "we are continuing"
        } else {
          boolean continue = true
          foreach stream s {
            if (!s.readyToContinue) {
              continue = false
              break;
            }
          }
          if (!continue) {
            email "Data is not available beyond the continue time"
            email "waiting for more data, or GAP_SKIP option"
            // this is a global gap, so don't mark any streams as GAP_MODE
            global_gap = true
          }
          //otherwise, these two events are ok, and we can continue
        }
      }
    }
  }
}
boolean continue = true;
if (!global_gap) {
  // see if any streams have no more data
  noMoreData = false;
  for (int i = 0; i < StreamList.size( ); i++) {
    Stream s = StreamList.get(i);
    if (!s.hasMoreData( )) {
      noMoreData = true;
    }
  }
  if (!noMore Data) {
    // do gap detection at the stream level
    LinkedList StreamList;
    int NumGaps = 0;
    // first look and see if there are any gaps
    for (int i = 0; i < StreamList.size( ); i++) {
      Stream s + StreamList.get(i);
      // compute if it has a gap. <-- deal with setting the state of the stream
      if (s.isGap(nextEvent.time, GAP_TIME)) {
        NumGaps ++;
        email "Stream s had a gap."
      }
    }
    if (NumGaps >0) {
      email "There were <NumGaps> total gaps detected, skipping <GAP_SKIP> of them."
      while (NumGaps > 0 && GAP_SKIP > 0) {
        // skip a gap
        NumGaps--;
        GAP_SKIP--;
      }
    }
    if (NumGaps > 0) {
      // compute if we can continue or not
      if (GAP_CONTINUE >= 0) {
        for (int i = 0; i < StreamList.size( ); i++) {
          Stream s = StreamList.get(i);
          //compute if it has a gap.
          if (!s. continue(nextEvent.time, GAP_TIME, GAP_CONTINUE)) {
            continue = false;
          }
        }
        if (!continue) {
          email "not enough data to continue."
        } else {
          email "there was enough data to continue, continuing."
        }
      } // else, we don't ever continue if GAP_CONTINUE < 0
    } // else, no gaps, good to go
  } else { // there is no more data in a stream
    // if there is a stream with no more data, we need to determine if this is a gap or not.
    // if all the other can continue, we have detected a gap and will continue
    // if the others cannot all continue, we will store the stuff off, and stop normally
    // compute if we can continue or not
    if (GAP_CONTINUE >= 0) {
      for (int i = 0; i < StreamList.size( ); i++) {
        Stream s = StreamList.get(i);
        // compute if it has a gap.
        if (!s.continue(nextEvent.time, GAP_TIME, GAP_CONTINUE))
        {
          continue = false;
          break;
        }
      }
      if (continue) {
        // they all continue, so this is a gap
        email "Gap detected in stream s"
      } // else no gap was detected. the system should simply shut down.
    } else {
      // if GAP_CONTINUE is negative, we store it all off normally, no email is generated
      continue = false;
    }
  }
} else {
  continue = false; // could not process
}
if (continue) {
  //pass on the event to the Sessionizer.
} else {
  // shut down the streams
  // store the data from each stream into a .vdc file
}
```

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for detecting gaps in data, comprising:
defining at a computer at least a first stream associated with a particular user's activities and a second stream associated with that user's activities from a network topology for presenting a logical website, wherein each of the streams is a logical data source associated with one or more servers, wherein each server has hosts, data locations, or a combination thereof associated with the server, and wherein each server is responsible for running a different portion of the logical website, wherein the computer comprises a processor and a computer readable medium storing a computer program executable to detect gaps in data;
receiving incoming data from one or more sources at the computer and associating the incoming data with one of the streams based on a source of the incoming data, wherein the source is one of the one or more servers or one of the hosts or data locations associated therewith and the incoming data comprises data regarding previous activities at one of the one or more servers, hosts, or data locations;
calculating a data loss for each stream, wherein the data loss is calculated between a next event (nextEvent.time) and a last event (lastTime) in the stream, wherein the computer calculates the data loss and wherein the data loss is a time difference between the occurrence of the next event and the last event;
stopping the processing of every stream if the first or second stream's calculated data loss is greater than a first user defined threshold;
resuming processing according to a second user defined threshold;
determining whether each stream has a gap based upon the calculated data loss and a user defined threshold (GAP_TIME), wherein a gap is detected if (nextEvent.time>= (lastTime+GAP_TIME)), wherein the computer determines whether each stream has a gap.

2. The method of claim 1, further comprising stopping the processing of every stream if the first or second stream's calculated time difference is greater than a first time period.

3. The method of claim 2, further comprising resuming processing of the first or second stream upon reception of more data associated with the first or second stream.

4. The method of claim 3, further comprising resuming the processing of each stream in which the calculated time difference is not greater than the first time period.

5. A tangible non-transitory computer readable medium containing computer program instructions translatable for:
defining at least a first stream associated with a particular user's activities and a second stream associated with that user's activities from a network topology for presenting a logical website, wherein each of the streams is a logical data source associated with one or more servers, wherein each server has hosts, data locations, or a combination thereof associated with the server, and wherein each server is responsible for running a different portion of the logical website;
associating incoming data with one of the streams based on a source of the incoming data, wherein the source is one of the one or more servers or one of the hosts or data locations associated therewith and the incoming data comprises data regarding previous activities at one of the one or more servers, hosts, or data locations;
calculating a data loss for each stream, wherein the data loss is calculated between a next event (nextEvent.time) and a last event (lastTime) in the stream, wherein the data loss is a time difference between the occurrence of the next event and the last event;
stopping the processing of every stream if the first or second stream's calculated data loss is greater than a first user defined threshold;
resuming processing according to a second user defined threshold;
determining whether each stream has a gap based upon the calculated data loss and a user defined threshold (GAP_TIME), wherein a gap is detected if (nextEvent.time>= (lastTime+GAP_TIME)).

6. The computer readable medium of claim 5, wherein the instructions are further translatable for stopping the processing of every stream if the first or second stream's calculated time difference is greater than a first time period.

7. The computer readable medium of claim 6, wherein the instructions are further translatable for resuming processing of the first or second stream upon reception of more data associated with the first or second stream.

8. The computer readable medium of claim 6, wherein the instructions are further translatable for resuming the processing of each stream in which the calculated time difference is not greater than the first time period.

9. The computer readable medium of claim 6, wherein the instructions are further translatable for resuming processing after a second period of time.

10. A system for processing a real-time data feed, compromising:
a computer configured with definitions of at least a first stream associated with a particular user's activities and a second stream associated with that user's activities from a network topology for presenting a logical website, wherein each of the streams is a logical data source associated with one or more servers, wherein each server has hosts, data locations, or a combination thereof associated with the server, and wherein each server is responsible for running a different portion of the logical website, the computer comprising a processor and a tangible storage medium storing instructions executable by the processor to implement a method at the computer comprising:
receiving incoming data at the computer;
associating incoming data received over the network with one of the streams based on a source of the incoming data, wherein the source is one of the one or more servers or one of the hosts or data locations associated therewith and the incoming data comprises data regarding previous activities at one of the one or more servers, hosts, or data locations, wherein the associating is performed at the computer;
calculating a data loss for each stream, wherein the data loss is calculated between a next event (nextEvent.time) and a last event (lastTime) in the stream, wherein the calculating is performed at the computer, wherein the data loss is a time difference between the occurrence of the next event and the last event;

stopping the processing of every stream if the first or second stream's calculated data loss is greater than a first user defined threshold;

resuming the processing according to a second user defined threshold;

determining whether each stream has a gap based upon the calculated data loss and a user defined threshold (GAP_TIME), wherein a gap is detected if (nextEvent.time>= (lastTime GAP_TIME)), wherein the determining is performed at the computer.

11. The system of claim 10, further comprising stopping the processing of every stream if the first or second stream's calculated time difference is greater than a first time period.

12. The system of claim 10, further comprising resuming processing of the first or second stream upon reception of more data associated with the first or second stream.

13. The system of claim 10, further comprising resuming the processing of each stream in which the calculated time difference is not greater than the first time period.

14. The system of claim 10, wherein the processing resumes after a second period of time.

* * * * *